Sept. 23, 1952 C. H. SCOTT 2,611,474
RAKE CLASSIFIER AND LUBRICATING SYSTEM THEREFOR
Filed July 7, 1951 7 Sheets-Sheet 1
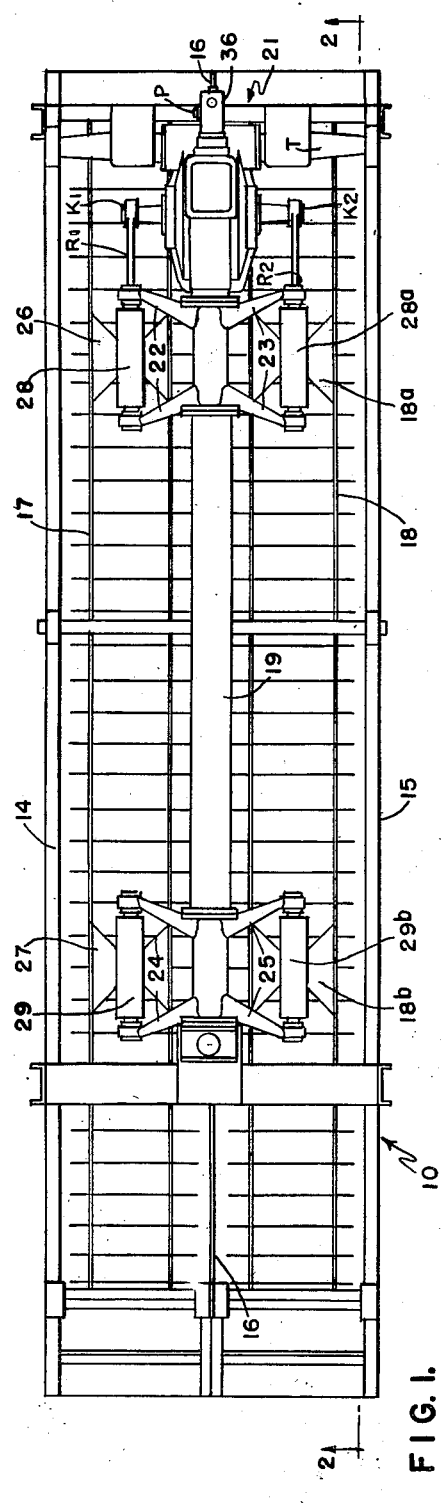
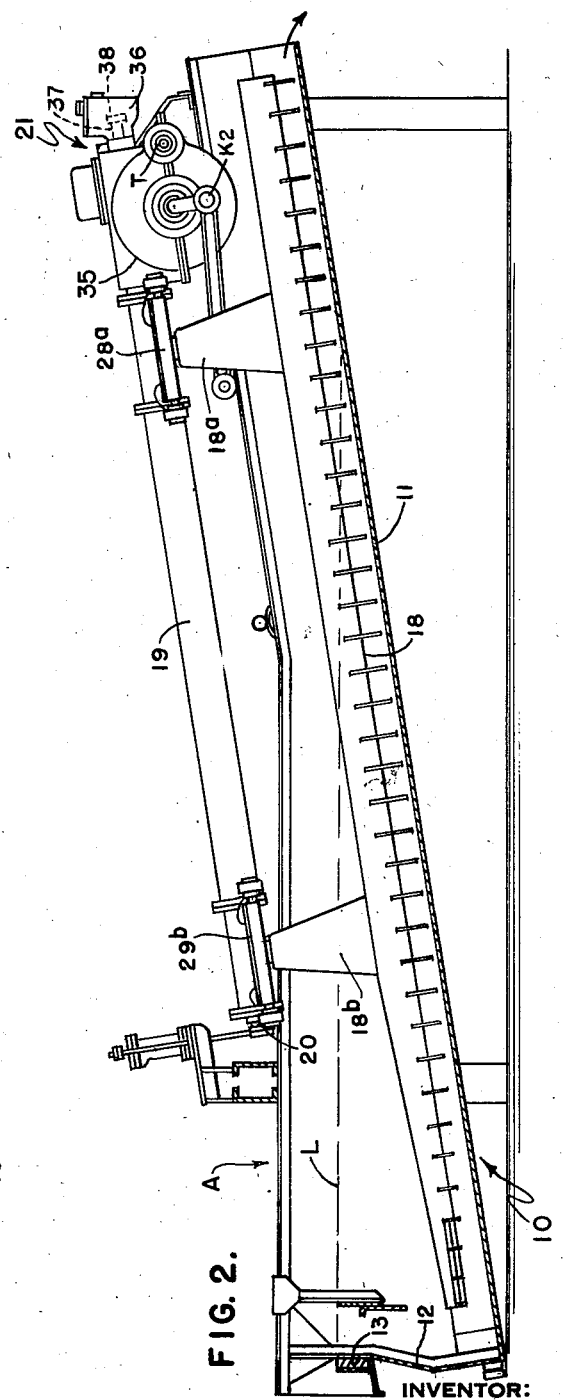
INVENTOR:
CHARLES HAROLD SCOTT,
BY William J. Fox
ATTORNEY Sept. 23, 1952  C. H. SCOTT  2,611,474
RAKE CLASSIFIER AND LUBRICATING SYSTEM THEREFOR
Filed July 7, 1951  7 Sheets-Sheet 2

INVENTOR:
CHARLES HAROLD SCOTT,
BY William J Fox
ATTORNEY

Sept. 23, 1952 C. H. SCOTT 2,611,474
RAKE CLASSIFIER AND LUBRICATING SYSTEM THEREFOR
Filed July 7, 1951 7 Sheets-Sheet 3
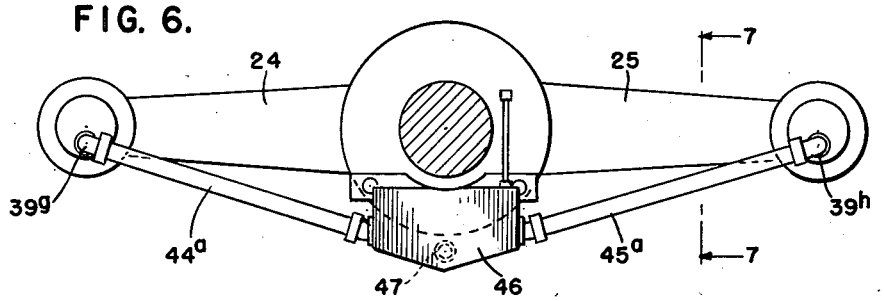
FIG. 6.
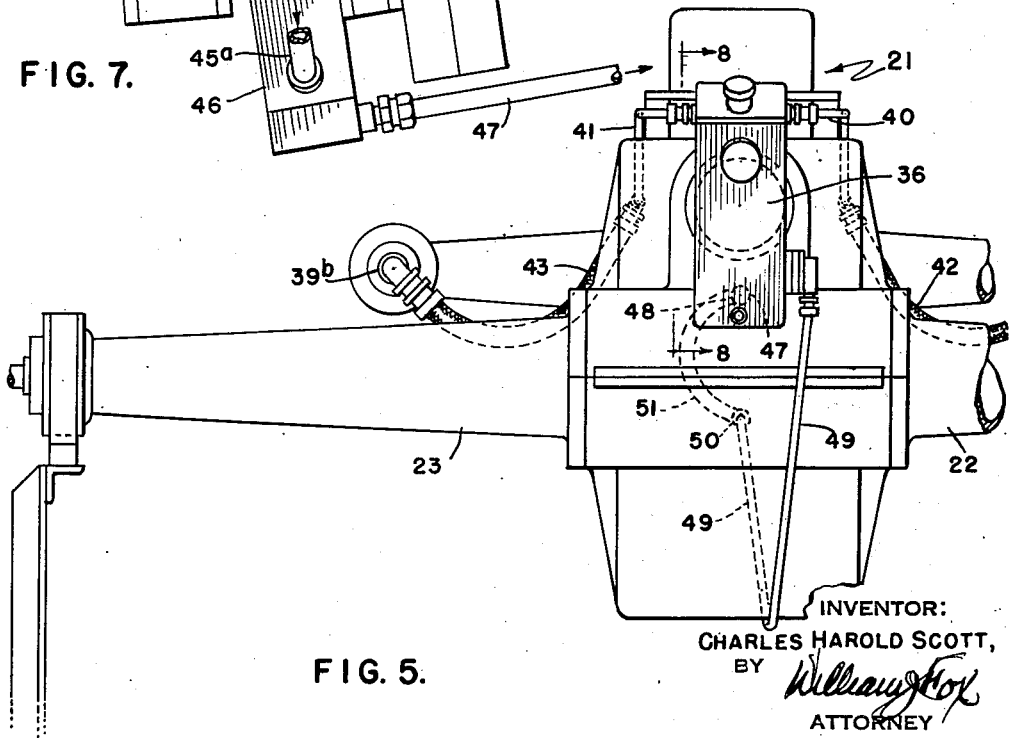
FIG. 7.
FIG. 5.
INVENTOR:
CHARLES HAROLD SCOTT,
BY William Fox
ATTORNEY Sept. 23, 1952  C. H. SCOTT  2,611,474
RAKE CLASSIFIER AND LUBRICATING SYSTEM THEREFOR
Filed July 7, 1951  7 Sheets-Sheet 4

INVENTOR:
CHARLES HAROLD SCOTT,
BY William Fox
ATTORNEY

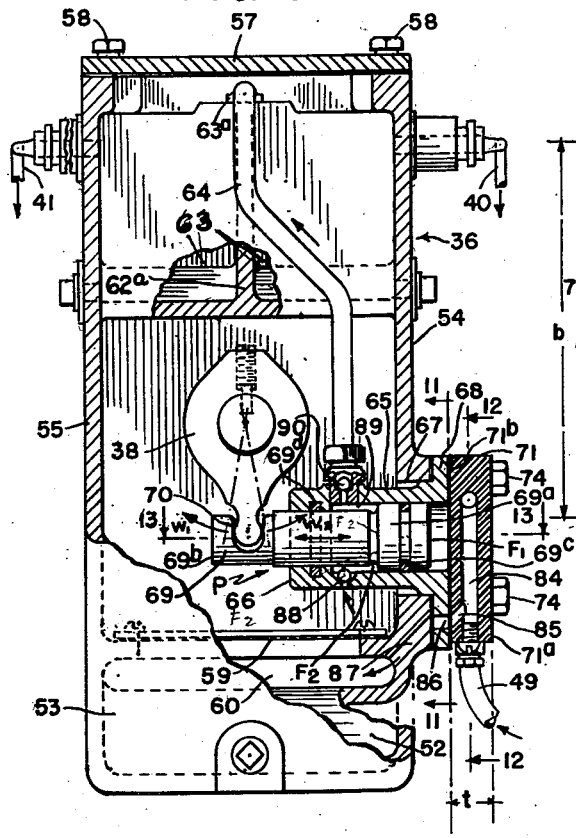
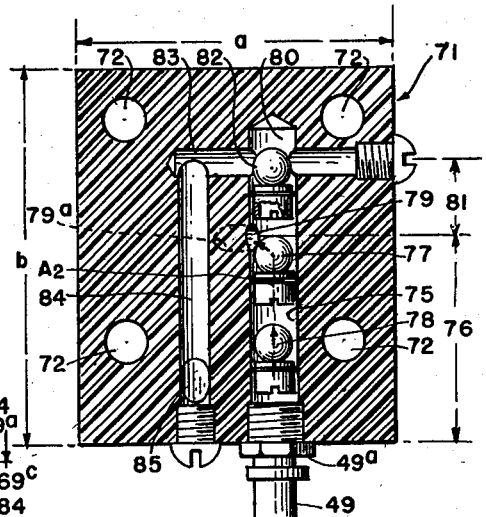
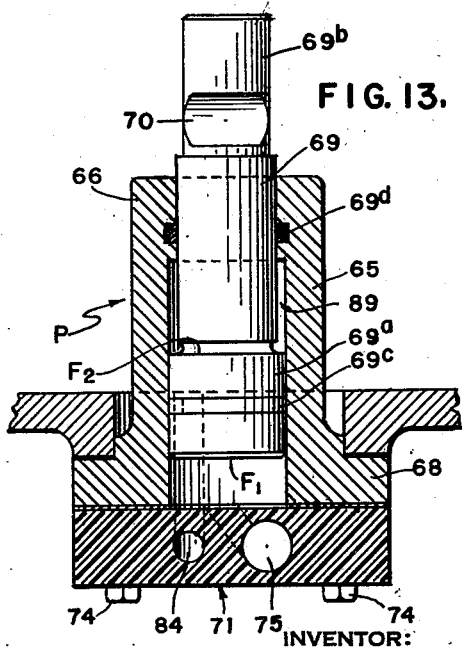
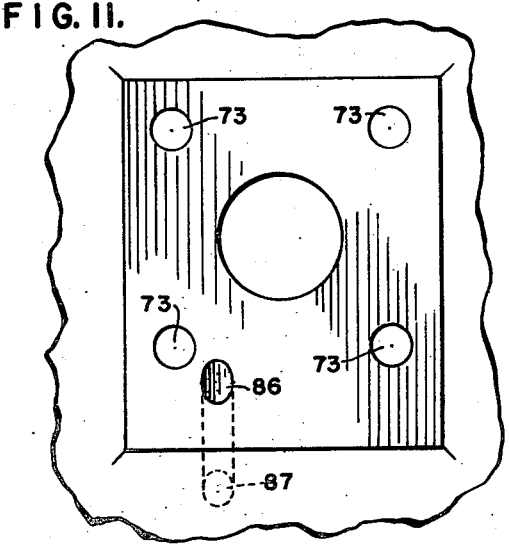

Sept. 23, 1952 C. H. SCOTT 2,611,474
RAKE CLASSIFIER AND LUBRICATING SYSTEM THEREFOR
Filed July 7, 1951 7 Sheets-Sheet 6

INVENTOR:
CHARLES HAROLD SCOTT,
BY William Fox
ATTORNEY

Sept. 23, 1952          C. H. SCOTT          2,611,474
RAKE CLASSIFIER AND LUBRICATING SYSTEM THEREFOR
Filed July 7, 1951                             7 Sheets-Sheet 7
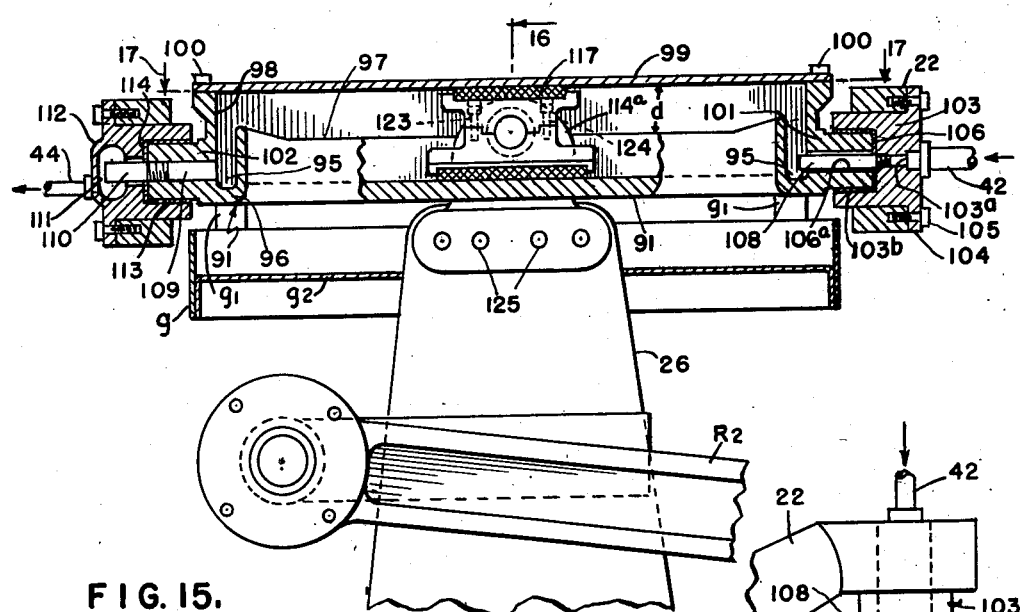
FIG. 15.
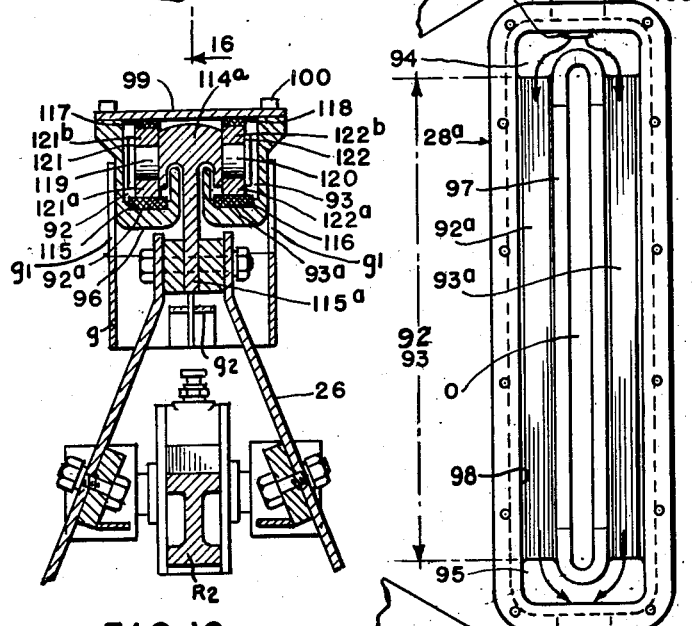
FIG. 16.
FIG. 17.
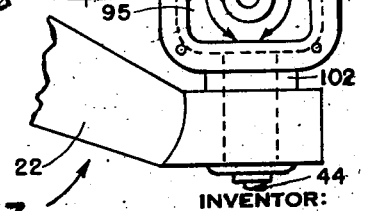
INVENTOR:
CHARLES HAROLD SCOTT,
BY    *William J. Fox*
ATTORNEY Patented Sept. 23, 1952

2,611,474

UNITED STATES PATENT OFFICE 2,611,474

RAKE CLASSIFIER AND LUBRICATING SYSTEM THEREFOR

Charles H. Scott, Westport, Conn., assignor to The Dorr Company, Stamford, Conn., a corporation of Delaware Application July 7, 1951, Serial No. 235,633

5 Claims. (Cl. 198—224)

This invention relates to what in the wet classification treatment of solids as in metallurgical, ore dressing, or other slurries is known as the reciprocating type of rake classifier which is capable of fractionating the mixture of solids contained in a slurry into a coarse solids fraction and a fraction of fines. More particularly, this invention relates to such a rake classifier and lubricating system therefor.

It is among the objects to provide such a rake classifier with a lubricating system that is simple, compact, efficient, reliable, as well as accessible, for continuously supplying lubricating oil to the sliding bearing faces in the rake actuating mechanism of a classifier such as disclosed and exemplified in the co-pending patent application of Charles H. Scott, Serial No. 88,619, such a lubricating system to supply lubricating oil by continuous pump sustained circulation to the reciprocally sliding bearing portions peculiar to the rake actuating mechanism of that machine. A clearer outline of this rake actuating mechanism as well as of the lubricating problem arising in conjunction therewith will appear further below.

Generally speaking a classifier of the reciprocating rake type briefly termed a rake classifier has a continuous supply of solids carrying slurry fed to a bath or pool contained in the classifier, and a rake mechanism operates in the classifier to fractionate the slurry solids fed to the bath according to size into a fraction of coarse solids also called the sands and a fraction of lighter or smaller solids called the fines, both fractions to be delivered continuously and separately from such a machine.

Such a rake classifier comprises a tank having an inclined bottom or deck, the lower end of which makes the deep end of the slurry pool while a higher up intermediate portion of the deck defines the shallow end of the pool. The rake structure extends parallel to the deck and has its lower end portion immersed in and reaching into the deep end of the pool. An actuating mechanism herein termed the rake actuating mechanism imparts to the rake structure a reciprocating motion along a cyclic path which comprises an upward longitudinal stroke along the tank bottom whereby settled solids are conveyed up along the deck towards emergence and discharge, and a longitudinal return stroke during which the rake is kept raised a suitable distance from the bottom. That is to say, the rake structure is lowermost and is in solids-raking relationship to the deck during the upward raking strokes, and is uppermost as well as a distance away from the deck during the downward return strokes, and it is to be raised and lowered relative to the inclined tank bottom during the transition between raking strokes and return strokes. In this way, the coarse solids fraction or sands are delivered by the rake structure from the shallow end of the pool to constitute the so-called rake product, while the fraction of fines being of a small enough size to be kept in suspension by the rake agitation in the pool is delivered by way of liquid that is allowed to overflow from the tank at the deep end of the pool.

More particularly, the rake classifier disclosed in the above-mentioned Scott application is of the twin-rake type in which two rake structures operate side by side in the tank, operatively supported by and from their actuating mechanism in such a manner that the weight of the one rake structure balances that of the other as the rake structures are raised and lowered in alternation with respect to the tank bottom. In other words, the mechanism operates in such a manner that an upward solids raking stroke imparted to the one rake structure coincides with a downward return stroke of the other rake structure, while the lowering of one rake structure at the end of its return stroke coincides with the raising of the other rake structure at the end of its solids raking stroke.

The rake actuating mechanism in the aforementioned Scott application comprises as its basic element an inclined oscillatable shaft which extends parallel to and is coextensive with the longitudinal extent of the rake structures as well as parallel to the inclined tank bottom or deck and it extends medially of and directly above the deck. This longitudinal shaft has at its upper end a pair of upper arm structures extending laterally in opposite directions from the shaft, and similarly it has at its lower end a pair of lower arm structures extending laterally in opposite directions from the shaft, all arm structures being rigid with the shaft and oscillatable or rockable therewith. The upper arm structures furnish operating support for the upper end portions of the respective rake structures, while the lower arm structures furnish operating support for the lower end portions of the respective rake structures, each rake structure having an upwardly extending upper and lower rake hanger or bracket rising rigidly from the rake structure whereby the rake structures are suspended from the arm structures. To provide for longitudinal reciprocating movement of the rake structures each structure is provided at each free end thereof with a longitudinal track member having a flat track face extending parallel to the medial shaft, upon which track member is slidably supported a glide shoe provided at the upper end of a respective hanger or bracket of a respective rake structure. The track member is pivotally mounted upon the arm structure so as to be capable of slight compensatory oscillating movement about a longitudinal axis which is parallel to that of the oscillatable medially disposed shaft. In this way, one rake structure is supported operatively by and from a pair of track members, an upper and a lower one, at one side of the inclined longitudinal shaft, while the other rake structure is similarly supported by and from an upper and a lower track member at the opposite side of that shaft.

A drive mechanism is provided whereby the oscillatory movement of the longitudinal shaft is coordinated to the longitudinal movements of the rake structures in such a way that, after the cross-arm constructions have been tilted in one direction by the actuation of the oscillatable shaft for lowering one rake structure and raising the other, an upward solids raking stroke is imparted to the lowered structure while simultaneously a downward longitudinal return stroke is imparted to the raised structure. At the simultaneous completion of both strokes the cross-arm structures are tilted in the opposite direction by the actuation of the oscillatable longitudinal shaft, whereupon reversed strokes are imparted simultaneously to the respective rake structures, whereupon at the completion of the strokes the cross-arm constructions are again tilted in the opposite direction for completing the bodily cyclic movement or cyclic path of the rake structures.

A problem lay in how to properly lubricate and maintain the track members in view of the fact that these classifiers must operate for instance in ore dressing plants where it is virtually impossible to fully protect and seal off the sliding bearing faces of the track member against the deposition thereon of abrasive-laden dust. Hence the problem of providing a lubricating system in and for such a classifier.

In order to protect the sliding bearing faces of the mechanism as far as possible against the undesirable effects of dust and against excessive wear and tear, there is included in the lubricating system of this invention a track construction which provides a trough-shaped double-track member in which a pair of unitary trough-shaped tracks extend parallel to one another with an elongated narrow opening provided between them. More specifically, in this double-track member the ends of the two trough-shaped tracks are interconnected at their respective ends by a short transverse trough portion at each end so that the double-track member in effect constitutes an endless trough of which the parallel long portions contain the tracks proper. A suspension bracket or hanger rising rigidly from a respective rake structure extends upwardly through the elongated opening between the tracks of such a member and terminates in a T-shaped end provided with a glide shoe at each end of the cross beam of the T-shape, each such glide shoe engaging and being supported by a respective track in the double-track member. In this way each end portion or each hanger of each rake structure is supported from a double track member with the rake hanger depending from beween the two tracks of the double-track member, and the two glide shoes extending into the respective longitudinal trough portions which constitute the tracks in that member. A removable cover closes the entire endless trough of such a double-track member, making it in effect a double track casing within which a pair of glide shoes operate relatively well-protected.

Each double-track member is oscillatably carried by and between a pair of supporting arms which constitute one side or one-half of the aforementioned cross-arm construction of the medially extending inclined oscillatable shaft. That is to say, the double-track member is disposed between and carried by the free ends of the pair of supporting arms and is oscillatable thereon about a longitudinal axis by means of a pair of pivots, one pivot extending from each end of the double-track member, each pivot having its bearing in the free end of a respective supporting arm.

The rake actuating mechanism of this classifier construction comprises a drive head mounted at the high end of the classifier deck, for imparting oscillation to the medial shaft and also for imparting reciprocating movement to the rake structures so timed with respect to the oscillations of the shaft that each rake performs its cyclic movement although with a phase shifting of 180° between the movements of the two rake structures. The drive head comprises a gear box or housing fixed with respect to the high end of the classifier tank, in which is rotatably mounted a driven transversely extending rake reciprocating crank shaft having a crank at each free end thereof with a connecting rod betwen each crank and its associated rake structure. In this way, since the cranks are offset 180° with respect to each other the rotation of the transverse shaft will impart to the rake structures longitudinally reciprocating movements with a 180° shifting of phase. In order to furnish the up and down transverse component of the cyclic movement of the rake structures, a cylindrical cam member is provided coaxial with and fixed upon the intermediate portion of the transverse crank shaft for effecting the properly timed oscillation of the longitudinal inclined shaft. Therefore, rotation of the crank shaft will impart to one of the rake structures its elevated return stroke, while imparting to the other rake structure its solids-raking stroke. The alternate raising and lowering of the rake structures during the transition between the raking stroke and return stroke is effected by the cam member positively engaging an arm rigidly extending from the upper end portion of the longitudinal inclined shaft so as to oscillate the shaft in a positive manner and in properly timed relationship with respect to the longitudinally reciprocating movements or strokes of the rake structures carried by the cross-arm constructions of that shaft. Thus during an operating cycle of the actuating mechanism the rake structures are motivated longitudinally in respective opposite directions by the cranks after the longitudinal inclined shaft has been rocked by the cam member in the one direction and has thus brought the rake structures to their respective raised and lowered positions. Substantially at the end of these longitudinal movements or strokes of the rake structures the longitudinal inclined shaft is rocked in the opposite direction by the revolving cam member thus lowering the one rake structure at the end of its downward return stroke while raising the other rake structure at the end of its upward solids raking stroke, with respect to the classifier deck.

While this rake actuating mechanism of the co-pending Scott application constitutes a recent and successful development in classifier construction, and particularly in rake actuating mechanisms, it presented the problem above indicated regarding the lubrication of the longitudinal tracks, in view of the fact that to seal off the tracks completely against the dust and abrasive laden atmosphere of their operating environment appears to be impracticable even with the novel and otherwise efficient construction of the track members or track casings provided in and by this classifier.

This invention is based upon the concept that rather than providing lubrication with grease of the conventional high consistency as with conventional grease-cup fittings, there should be employed lubrication by flowable oil by means of continuous circulation of lubricating oil from an oil reservoir to the tracks and from the tracks to the oil reservoir, by way of a circulating oil pump, the oil thus to serve for carrying and flushing away abrasive dust particles which might find their way, even though labyrinthically, to the tracks within the track members or track casings.

According to this concept a pump should deliver lubricating oil to a high point at the head or high end of the classifier, whence the oil is to gravitate through suitable conduits such as pipes and/or flexible tube or hose connections to, into, and again from the track casings. The oil, while keeping the tracks everchangingly lubricated, and having drained or gravitated from the track casings to a point at the deep end of the classifier tank, is to be pumped back to the high point at the head end of the classifier.

It is among the objects of this invention to provide for the operating tracks of the rake structures a simple and compact as well as efficient oil circulating lubricating system, such a system to be readily accessible and serviceable in its essential parts especially with respect to a pump and an oil reservoir provided in the system, the pump moreover to have simple and compact mechanical drive means to be actuated directly by the operation of the rake actuating mechanism.

In view of the environmental structure as presented by the classifier and its appurtenances, the organization of the lubricating system is to be such as to readily lend itself for whatever manipulation is necessary to effect a change of oil in the reservoir, or to inspect and ascertain the condition of the oil in the reservoir.

Another object is to provide such a lubricating system with a pump having a minimum of moving actuating parts and with the parts well protected by and enclosed within the system itself, yet readily accessible, inspectable and removable, which system furthermore is to be capable of being readily installed upon the classifier.

These objects are attained by providing a lubricating system that extends substantially along, and closely hugs the length of the medial inclined oscillating shaft, a plunger oil pump as well as an oil reservoir being provided in close association with each other and characteristically disposed at the upper end of that shaft, with the pump plunger to be reciprocated by and at the same frequency as that of the oscillations of the shaft.

According to one feature, the pump plunger is reciprocated directly by the oscillations of the medial inclined shaft, namely by an arm or finger extending from the upper end portion of the medial shaft into direct engagement with the pump plunger so that the oscillation of the shaft will impart corresponding reciprocating movements to the pump plunger.

According to a further and more specific feature, the pump is structurally and functionally directly associated with and mounted upon and carried by an oil reservoir to constitute a compact unit therewith, the reservoir in turn being carried by and mounted upon the drive head or gear casing at the high or head end of the classifier deck. According to this feature there is established a unique, compact, and efficient relationship of parts, in that the free end or stem of the pump plunger protruding from the pump cylinder as well as the shaft-oscillated actuating finger engaging the stem operate inside the reservoir and are submerged in the body of oil therein.

Further particularized, this pump carried by the oil reservoir at the head of the classifier tank has a double-acting plunger comprising a piston portion at its outer end and a stem portion at its inner end. At its outer side the piston portion draws spent oil drained from the tracks from a low collecting point at the lower end of the medial shaft, and delivers such spent oil into the reservoir at the top, namely into a space or chamber at the receiving side of a screen provided in the reservoir. In this way the action of the pump causes oil to be passed through the screen or filter member and to rise from the discharge side of the screen into a space or chamber provided by the reservoir at that side of the screen. The inner side of the piston, which is annular extending around the stem, draws filtered oil from above the screen and delivers it for discharge and distribution to the upper tracks of the rake structures whence the oil may gravitate through suitable pipes to the lower tracks and from there to a collecting point whence the pump again draws the spent oil to the reservoir at the top end of the shaft. That is to say, an axial extension of the upper end of the medial shaft being of reduced diameter extends sealingly through the wall of the oil reservoir, the pump-actuating finger element being fixed to that extension within the confines of the reservoir. Coaction between the actuating finger and the pump plunger is established by the pump being mounted upon the reservoir itself in such a manner that the stem portion of the plunger extends inwardly into the reservoir and into direct engagement with the oscillatable actuating finger within the body of oil held by the reservoir.

More specific features lie in the particular structural and functional relationships between the pump and the reservoir in conjunction with the structural and functional relationships between the reservoir and the rake actuating mechanism.

Therefore, a feature lies in the fact that the reservoir in effect surrounds the upper end portion of the medial shaft, and is carried by and rigidly mounted upon the gear casing of the aforementioned drive head, that further the pump cylinder has a front or outer open-ended flanged end portion and an inner end portion closed by the free rear end or stem of the pump plunger. The inner end portion of the cylinder with the plunger stem protruding inwardly therefrom extends through an opening in the wall of the reservoir while the flanged outer end of the cylinder is fastened to the outer face of the surrounding adjacent wall portion. An end plate containing certain ports and valves closes the outer flanged end of the pump cylinder and is readily removable for inspecting the pump interior as well as for inspecting the ports and valves.

The pump plunger is double-acting in that the outer side of the plunger piston handles a relatively large cylindrical volume of fluid, while the other side of the piston, which is smaller and annular surrounding the plunger stem, handles a smaller annular volume, namely the volume surrounding the plunger stem. That is to say, as the plunger is moved inwardly into the reservoir by the actuating finger the outer side of the piston draws a relatively larger volume of spent oil from the lower oil collection point into the cylinder, while delivering a smaller oil volume notably filtered from the other side of the piston into a discharge compartment associated with the reservoir and disposed above the pump so that oil overflowing from this discharge compartment may gravitate to the tracks. As the plunger is moved into the opposite and outward direction with respect to the reservoir, it delivers the aforementioned larger volume of oil inclusive of impurities or grit or the like to a space or chamber in the reservoir beneath the screen, while a smaller volume of oil is simultaneously drawn from above the screen for delivery to the discharge chamber and thence to the tracks.

With such organization of the lubricating system and such disposition of the parts, the condition and amount of oil in the reservoir is readily ascertainable, an oil change can be readily effected, and the operation of the pump can be readily observed.

In summary, this invention comprises an oil circulating lubricating system for a twin-rake classifier in which the bodily cyclic motion of the rake structures is effected by a rake-actuating mechanism which comprises an inclined medially disposed oscillatable shaft having a pair of upper arm structures extending laterally in opposite directions from the shaft as well as a pair of lower arm structures extending laterally in opposite directions from the shaft. Each rake structure is suspended from a pair of arm structures, an upper and a lower one, upon which the rake structure is longitudinally reciprocatable by means of track members which in turn are also oscillatable upon the arm structures about an axis coextensive with that of the oscillatable shaft. A drive head at the upper end of the classifier deck imparts oscillations to the shaft as well as longitudinally reciprocating movement to the rake structures. The oscillations of the shaft and the reciprocations of the rake structures together in coordination impart to each rake structure the required cyclic movement which comprises an upward solids raking stroke, an elevated return stroke, and alternate raising and lowering of the rake structure as transitional parts of the cycle between the raking stroke and the return stroke.

The lubricating system comprises a pump and reservoir unit disposed at the upper end of the deck with the upper end extension of the oscillating shaft reaching into the reservoir for reciprocating the pump plunger disposed within the body of oil in the reservoir. The pump is double-acting to draw filtered oil from above a screen in the reservoir for delivering it to the track members whence it gravitates to a low collecting point, the pump also to draw spent oil from the low collecting point for delivering it to beneath the screen in the reservoir.

The pump cylinder has its free inner plunger end portion extending into the reservoir, while an outwardly exposed as well as detachable end member represents a valve head closing the opposite or outer end of the pump cylinder.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly co-operative equivalents, are therefore intended to be embraced by those claims.

In the drawings, Figure 1 is a somewhat diagrammatic plan view of the rake classifier with rake-actuating mechanism and having the lubricating system therefor merely indicated by the oil reservoir at the head end of the tank.

Figure 2 is a longitudinal section of the classifier along the line 2—8 of Figure 1, comprising a side view of the oil reservoir.

Figure 5 is a head end view of the rake-actuating mechanism taken on line 5—5 of Figure 4, with an end view of the oil reservoir and oil conduits leading therefrom and thereto.

Figure 6 is an end view taken on line 6—6 of Figure 4, showing the foot end of the rake-actuating mechanism and end view of the spent oil collecting point and oil conduits leading thereto and therefrom.

Figure 7 is a part-sectional view taken on line 7—7 of Figure 6, showing the spent oil collecting point from the side.

Figure 10 is a vertical section taken on line 10—10 of Figure 8, including a longitudinal section through the oil circulating pump and through the valve head thereof.

Figure 11 is an enlarged detail view taken on line 11—11 of Figure 10 of the outer flanged end of the oil circulating pump.

Figure 12 is an enlarged vertical cross-section of the valve head of the pump, taken on line 12—12 of Figure 10.

Figure 13 is an enlarged horizontal detail section of the pump, taken on line 13—13 of Figure 10.

Figure 15 is an enlarged longitudinal sectional view of one of the track members with cross head and operating tracks protectively encased therein, and oil supply and discharge connections therefore taken on line 15—15 of Fig. 4.

Figure 16 is a vertical sectional view of the track member taken on line 16—16 of Figure 15.

Figure 17 is a top view of the track member, taken on line 17—17 of Figure 15, with the cover plate of the track member and the cross head omitted.

Figure 3:
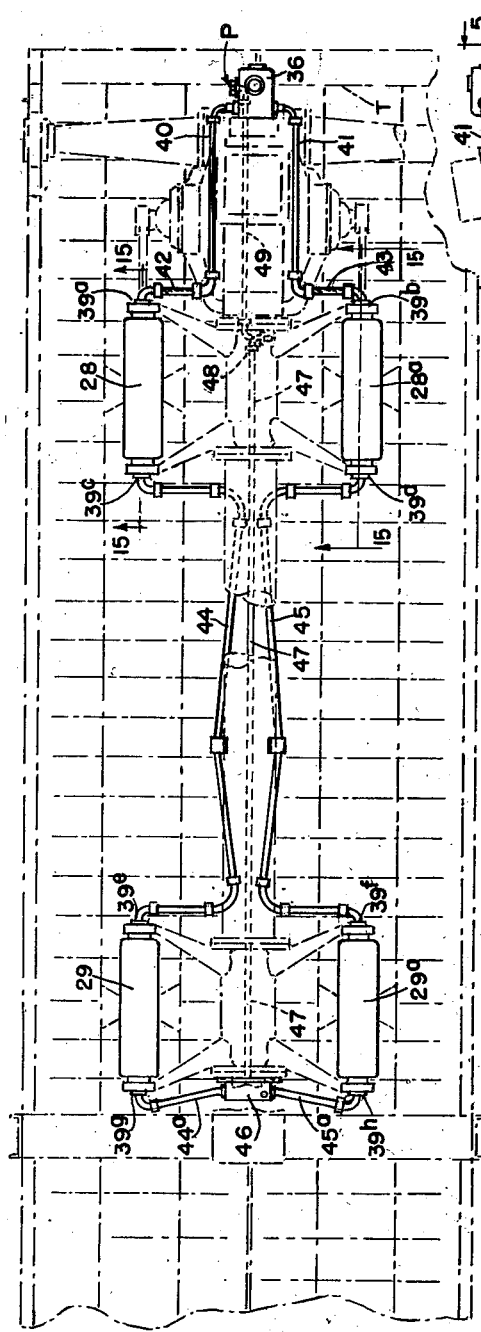
Figure 3 is an enlarged plan view of the parts of the rake-actuating mechanism and of the lubricating system associated therewith.

The lubricating system of this invention is associated with the rake-actuating mechanism of a twin-rake classifier which in Figures 1 and 2 comprises a tank 10 having an inclined bottom or deck 11, an end wall 12 rising from the lower end of the deck and provided with an overflow weir 13, a pair of side walls 14 and 15, and an intermediate partitioning wall 16 parallel to the side walls and defining a two-compartment tank in which operate respective rake members 17 and 18 extending parallel to one another as well as parallel to the inclined tank bottom. The lower end-portion of each rake member operates in a pool of solids-carrying slurry indicated by an overflow level L defined by the elevation of weir 13, the pool in each tank compartment having a continuous supply of slurry fed thereto indicated by arrow A.

Both rake members 17 and 18 are actuated by a single drive mechanism, each rake member to perform a bodily cyclic motion whereby it maintains its slurry pool sufficiently agitated to cause the finer solids or so-called fines among the slurry solids to remain in suspension and to be discharged from the pool by way of overflow weir 13, whereas the heavier solids sink to the bottom where they are moved up stepwise by the rake members along the deck to emergence from the pool and finally to discharge from the top end of the deck.

Each rake member has an upper and a lower hanger or bracket rising rigidly therefrom, by means of which hangers the rake member is operatively suspended from a rake-actuating mechanism which imparts to each rake member the cyclic bodily movement which comprises an upward solids conveying stroke along the deck, an elevated return stroke with rake member spaced away from the deck, and transverse up and down movements between the conveying stroke and the return stroke.

Figure 8:
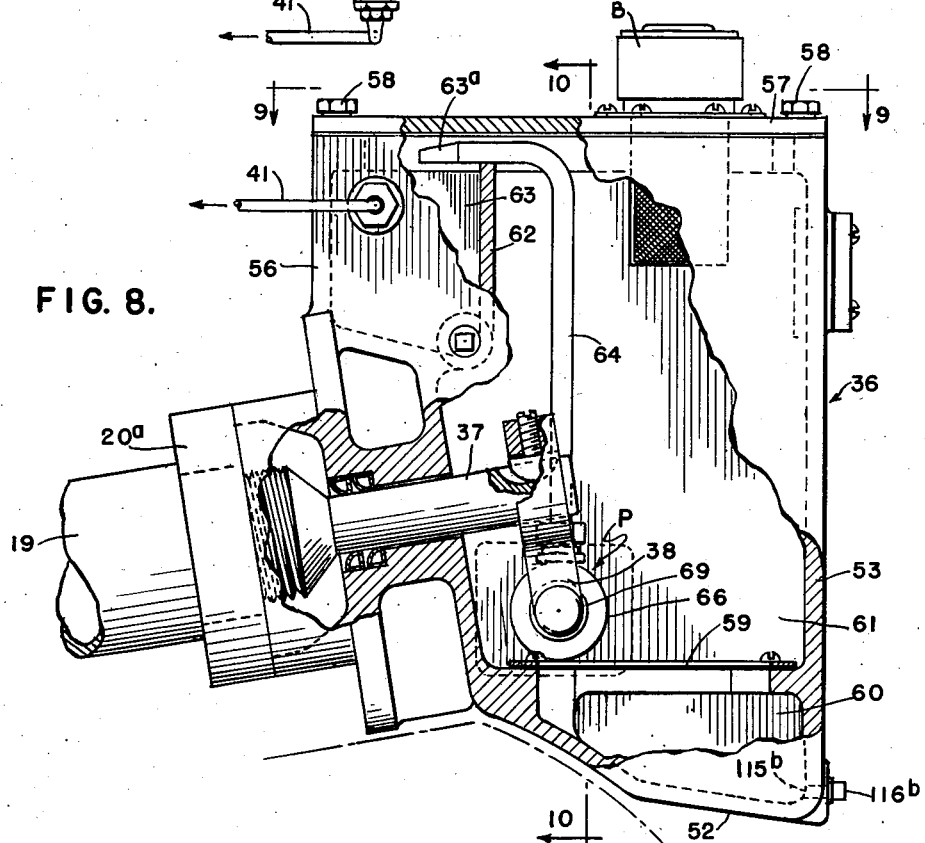
Figure 8 is an enlarged part-sectional detail side view of the oil reservoir taken on line 8—8 of Figure 5.

The rake actuating mechanism for imparting such cyclic movements to the rake members comprises an inclined oscillatable shaft 19 coextensive with the inclined deck and disposed centrally of the tank, namely directly above the partitioning wall 16. This shaft has its lower end supported in a bearing 20 and its upper end in a bearing which is provided by a drive head 21 and indicated at 20$^a$ in Figure 8. The drive head 21 may herein be termed a compound drive head because it imparts oscillatory motion to the shaft 19 as well as reciprocating motion to the rake members, both motions being coordinated in a manner to produce as a compound effect the desired cyclic movement of the rake members whereby the rake members move in complementary fashion in that the one performs its solids raking stroke as the other performs its return stroke and vice versa, and the one rake member is raised as the other is lowered and vice versa. The drive head 21 is supported by and mounted upon the upper or head end of the tank, that is at the upper end of the sloping deck 11 thereof.

The shaft 19 has rigid therewith an upper pair of laterally extending arm structures, the one arm structure comprising a pair of arms 22 extending laterally in one direction, and the other arm structure comprising a pair of arms 23 extending laterally in the opposite directions, from the shaft; and a lower pair of similar laterally extending arm structures, namely one arm structure comprising a pair of arms 24 extending laterally in one direction, and another arm structure comprising a pair of arms 25 extending laterally in the opposite direction. The upper pair of arms 22 carry the upper end of rake member 17 while the lower pair of arms 24 carry the lower end thereof, the rake member 17 being suspended from these arms 22 and 24 by way of hangers or brackets 26 and 27 rigidly rising from the rake member 17. The upper hanger 26 is slidably supported upon an upper track member 28, while the lower hanger 27 is supported upon a lower track member 29, which track members in turn are carried by the arms 22 and 24 respectively. That is to say, each track member has its ends supported by a pair of associated arms, for instance the track member 28 is supported by and between the free ends of its pair of arms 22 and by means of a pair of end trunnions in a manner whereby the track member is rendered capable of slight oscillatory movement about its longitudinal axis which is coextensive with and parallel to that of the oscillatory shaft 19. Track member 29 is similarly supported for oscillation by arms 24. Similarly, the rake member 18 is supported through a pair of hangers or brackets 18$^a$ and 18$^b$, an upper track member 28$^a$ oscillatably supported by arms 23 and a lower track member 29$^b$ oscillatably supported by arms 25. The track members have operating tracks proper protectively encased, such members therefore to be more clearly described further below.

The mechanism of the drive head 21 is contained in a housing 35 and is driven by a transverse shaft T from a prime mover not shown. This drive head functions to oscillate the shaft 19 substantially at the completion of each longitudinal stroke of the rake members, thereby imparting to these members the required cyclic step-by-step solid movement. In fact, the drive head 21 comprises a crank shaft K driven by the shaft T, the crank shaft K being formed at its free ends with cranks $K_1$ and $K_2$ respectively, which cranks have a 180° offset respective to each other. The cranks $K_1$ and $K_2$ reciprocate respective connecting rods $R_1$ and $R_2$ which operatively connect the cranks with respective rake structures 17 and 18.

In order to keep the operating tracks in track members 28, 29, 28$^a$ and 29$^b$ continuously lubricated with everchanging oil effective to flush impurities from the tracks, there is provided an oil circulating system which comprises, characteristically, an oil reservoir 36 supported by and connected with the drive head 21 (see Figure 2), the reservoir in turn having mounted therein an oil circulating plunger pump P actuated from the oscillatory shaft 19, namely by an axial extension 37 thereof the extreme end of which has fixed thereon a finger 38 for directly engaging and reciprocating the pump plunger by the oscillation of shaft 19, as will be explained in detail further below in conjunction with detail drawing Figures 8 to 13.

Figure 4:
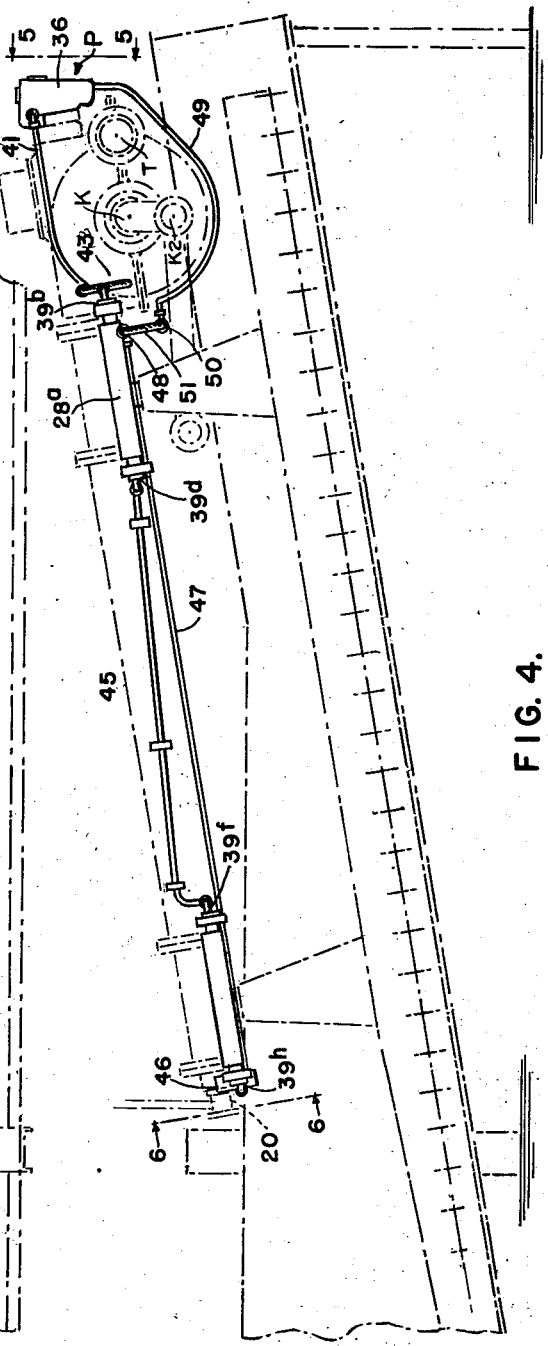
Figure 4 is a side view of the parts and lubricating system of Figure 3.
Figure 9:
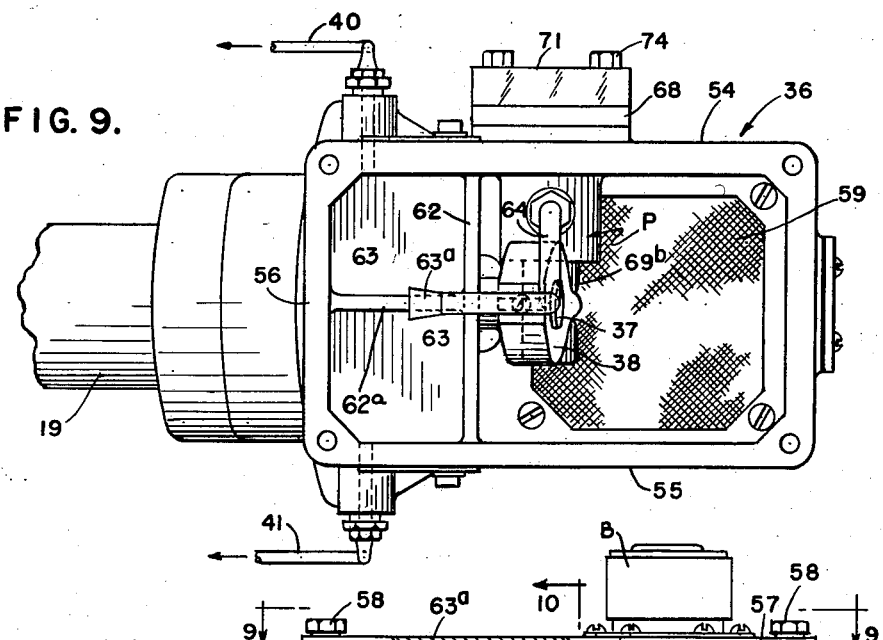
Figure 9 is a top view of the oil reservoir of Figure 8, with its cover removed.

However, the lubricating system as a whole will now first be outlined by reference to Figures 3 and 4. The oil reservoir 36 is mounted upon the extreme outer end of the drive head 21 and carries in it the oil circulating pump indicated at P. This is a double acting pump, the detailed construction and arrangement of which will be described further below. That is, the pump draws into the reservoir 36 spent oil from a low point of the rake-actuating mechanism, to which it has gravitated from the track members, while at the same time feeding oil after filtration thereof back to the track members.

For carrying the oil to and from the track members in circulation the lubricating system comprises a pair of symmetrically disposed oil discharge and distributing pipes 40 and 41 each of which leads off a respective side of the reservoir 36. The conduits 40 and 41 are stationary pipes disposed each at a respective side of the drive head 21, the ends of which pipes are connected through flexible tubes 42 and 43 to respective upper ends of the upper tracks 28 and 28ª, whereby they are adapted to feed oil to the tracks through their upper trunnions 39ª and 39ᵇ herein also termed the inlet trunnions. The oil having served as lubricant for the tracks of track members 28 and 28ª while flushing impurities therefrom gravitates from these track members through their lower track trunnions 39ᶜ and 39ᵈ, herein also termed outlet trunnions, and into pipe conduits 44 and 45 fixed to the oscillatory shaft 19 and leading to inlet trunnions 39ᵉ and 39ᶠ respectively of the lower track members 29 and 29ª. That is to say, the oil from the two upper track members 28 and 28ª now enters the two lower track members 29 and 29ª by way of inlet trunnions 39ᵉ and 39ᶠ respectively, then once more to serve as lubricant for the tracks while flushing impurities therefrom when gravitating from these tracks through their outlet trunnions 39ᵍ and 39ʰ respectively.

From the outlet trunnions of 39ᵍ and 39ʰ of the lower track members 29 and 29ª the oil gravitates into respective pipes 44ª and 45ª converging to a common point of collection in that they terminate in a collecting chamber 46 mounted upon the lower end of the oscillatory shaft 19.

An oil suction connection whereby the circulating pump P may draw spent oil from the collecting chamber 46, comprises a suction pipe 47 leading from the collecting chamber 46 upwardly along and fixed to the underside of the oscillatory shaft 19 to a point 48 near the drive head 21, a stationary tube 49 leading from a point 50 near point 48 along the underside of drive head 21 and then again upwardly to the pump P and thus to reservoir 36, and a flexible tube 51 inter-connecting the end 48 of movable pipe 47 with end 50 of stationary pipe 49.

With such a combination of rigid pipe and flexible tube connections provided between the oil reservoir 36 at the head end and the collecting chamber 46 at the foot end of the classifier tank, the oil circulating pump P operates at one piston side thereof to continuously draw spent oil from the collecting chamber 46 into the pump cylinder and to deliver it into the reservoir 36 at a rate which causes it to rise through a filter medium in reservoir 36. Filtered oil from above the filter medium is drawn by the opposite side of the pump plunger into the pump cylinder and delivered by the pump to the track members.

Referring to Figures 8 to 13, the reservoir 36 consists of a bottom 52, a vertical rear wall 53, a pair of vertical side walls 54 and 55, an irregularly shaped front wall 56, and a cover 57 constituting the top of the reservoir and fastened thereto as by screws 58. A filling cap or breather B is shown to be provided in the cover 57. Horizontally across the lower portion of the reservoir 36 and near the bottom thereof extends a screen or filter member or filter medium 59 dividing the reservoir 36 into a spent-oil receiving lower chamber 60 underneath the filter medium 59, and a filtered-oil chamber 61 above the filter medium 59. Spent oil is delivered by the pump into the chamber 60 and is forced by the pump to rise in the reservoir and through the filter medium 59 into chamber 61. In the top portion of reservoir 36 there is provided a transverse partitioning wall 62 defining a pair of discharge and distributing chambers 63 as defined by a feed splitting sub-partition 62ª to which oil is supplied by pump P through an upstanding tube 64 leading from the pump in chamber 61 upwardly and terminating in a spout 63ª for delivering oil into chamber 63. In this way, filtered oil from the reservoir may be continuously pumped to chambers 63 incident to the oscillation of the shaft 19, and the reciprocation of the plunger of pump P; the oil to overflow from chambers 63 into distributing pipes 40 and 41 for lubricating the track members.

The construction as well as the function of the double-acting pump P will be more clearly understood by reference to Figures 10, 11, 12, 13. This pump is mounted in the side wall 54 of reservoir 39 and comprises a cylinder 65 having an inner end portion 66 extend into upper chamber 61 of the reservoir, namely by way of an opening 67 in the wall thereof, and an outer flanged end portion 68 fastened to the outer face of the side wall 54. A plunger or plunger member 69 of the pump comprises a piston or piston portion 69ª and a stem or stem portion 69ᵇ, and is reciprocable within the cylinder with the stem portion extending or projecting from the inner end of the cylinder freely into oil containing chamber 61. Indeed this projecting end of the plunger has a notch or lateral recess 70 in which engages the free end of the oscillatory actuating finger 38 already referred to above in conjunction with the description of Figure 2. The piston portion 69ª is provided with an annular piston seal 69ᶜ, while a stationary sealing ring 69ᵈ is provided in the cylinder wall for sealing engagement upon the stem portion 69ᵇ. The plunger member 69 is double-acting in that it has an effective outer full piston face $F_1$ and an effective inner annular piston face $F_2$, each of which piston faces is effective to draw oil into the pump cylinder and to displace it therefrom, by way of inlet and outlet check valves provided at each respective end of the cylinder, such valve arrangements to be presently described.

The pump cylinder has a valve head 71 resembling a rectangular plate member of the thickness "t" and the sides "a" and "b." This plate member has an unbroken outer face 71ª and an inner face 71ᵇ contiguous with respect to and matching upon the outer face of the flanged end portion or cylinder flange 68. The valve head 71 consists of transparent material such as a transparent type of plastic, for example "Lucite." This valve head 71 registers with the rectangular cylinder flange 68, and it has a hole 72 in each corner registering with similar holes 73 in the cylinder flange, so that both the valve head 71 and the cylinder flange can be fastened one upon the other to the outer face of side wall 54 of the reservoir as by means of screws 74.

Figure 14:
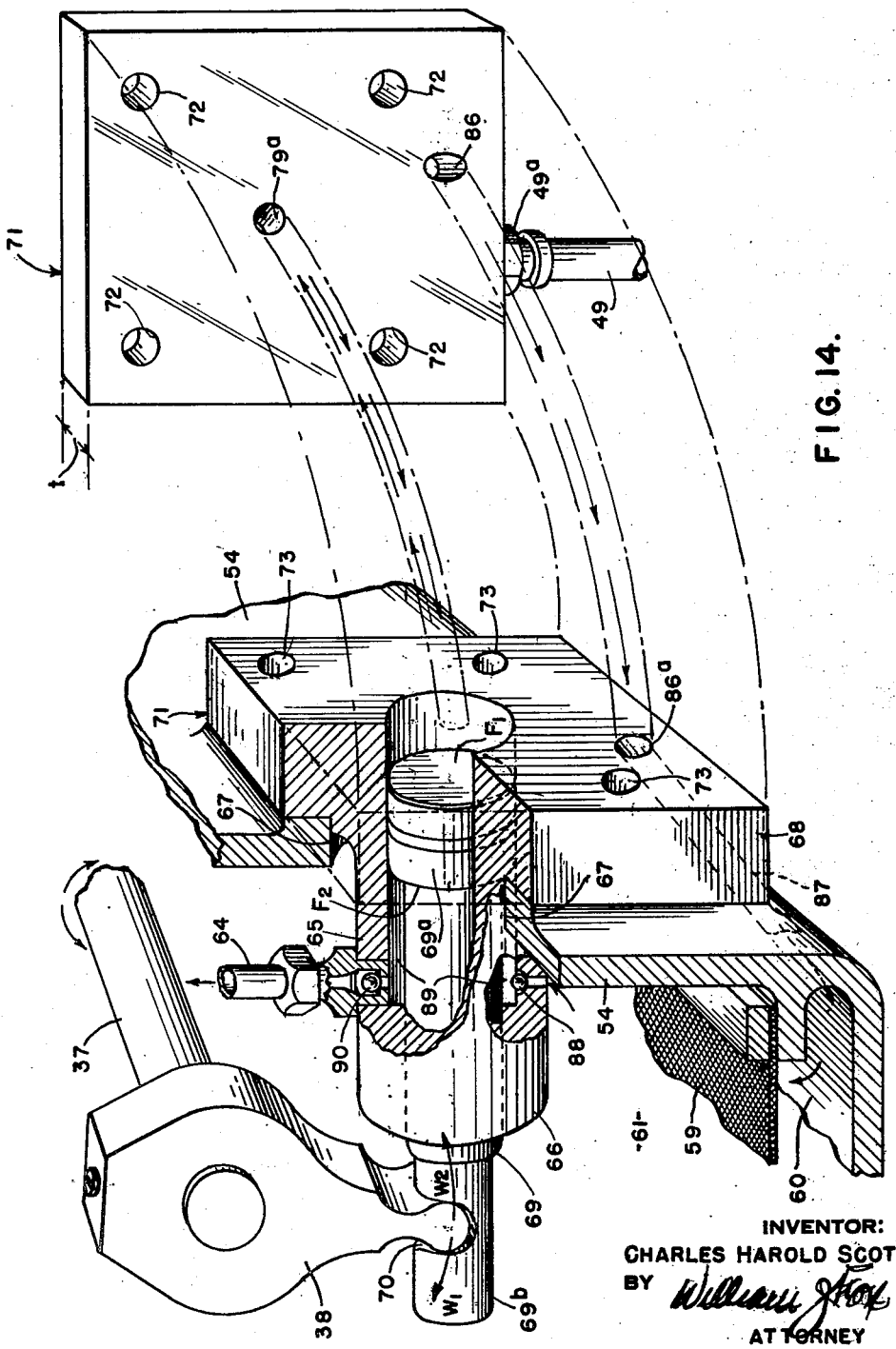
Figure 14 is a detail perspective view of the oil circulating pump and of its immediate structural environment, with the valve head lifted off in a manner to illustrate the operation of the pump.

The functional relationship of the valve head 71 to the pump cylinder and to the reservoir, in other words the double-acting function of the pump will appear more clearly from Figure 10 in conjunction with Figures 11, 12, 13, and particularly also in view of Figure 14.

The valve head 71 has an intake passage 75 (see Figure 12) the lower end of which terminates at the bottom edge of the valve head, which lower end has connected thereto the spent-oil suction pipe 49 as by means of nipple 49ª through which the outer face F₁ of the plunger piston may draw spent oil from the collecting chamber 46. The intake passage 75 consists of a compound bore insofar as it comprises a vertical length of bore 76 provided with a pair of ball check valves 77 and 78 in series allowing one-way flow of oil upwardly therethrough, and a transverse length of bore 79 terminating in an opening 79ª which interrupts the inner face 71ᵇ of the valve head 71 and which lies within the area defined by the outer face F₁ of the pump plunger.

The valve head 71 furthermore has a discharge passage 80 through which the outer face F₁ of the plunger piston may discharge oil from the cylinder into the lower chamber 60 of the reservoir. That is to say, the discharge passage 80 comprises a compound bore, namely a vertical length of bore 81 in upward continuation of the vertical length of bore 76, the bore 81 containing a ball check valve 82, a horizontal length of bore 83 and a vertical length of bore 84 leading downward from the horizontal length and into a transverse and downwardly inclined terminal length of bore 85 (see also Fig. 10) having a terminal opening 86 (see Fig. 11) interrupting the inner face 71ᵇ of the valve head 71. The terminal opening 86 registers through a hole 86ª in flange 68 with the adjacent end of a bore 87 (see Fig. 10) provided in the adjacent wall portion of reservoir 36, so that, incident to the reciprocation of the plunger 69, the outer piston face F₁ displaces oil from the cylinder through the discharge passage 80 by way of check valve 82 into the lower chamber 60 of the reservoir, whence oil must rise through the filter medium 59 into the upper chamber 61.

Also incident to the reciprocation of the plunger 69, the inner annular plunger face F₂ draws filtered oil through a ball check valve 88 provided in the cylinder wall at the under side thereof, from chamber 61 into the annular space 89 surrounding the plunger stem within the cylinder, to discharge the oil from the cylinder through a ball check valve 90 and through the above-mentioned upstanding tube 64 into the distributing chambers 63.

The construction of the track members is shown in the sectional views of the track member 28 as shown in Figures 15 and 16. The track member is in the form of a casing 91 and presents the basic shape of an endless groove which of itself in plan view appears as an excessively elongated O-shape defining a slot-like opening O and having a pair of parallel long groove portions 92 and 93 embodying and providing a pair of tracks 92ª and 93ª and a pair of short transverse connecting groove portions 94 and 95 at the respective ends of the tracks. The endless groove of this casing member or casting is defined by a bottom portion 96, on inner endless wall portion 97 rising from the inner edge of the bottom portion, and a correspondingly shaped but higher endless wall 98 rising from the outer edge of the bottom portion. A cover plate 99 conforming to the plan view outline of the outer wall is fastened to the top thereof as by screws 100, the cover plate thus being spaced a distance "d" from the top edge of the low wall 97.

The casing 91 is formed at each end thereof with a trunnion 101 and 102 respectively, the trunnion 101 being what was above termed the oil inlet trunnion, while the trunnion 102 was termed the oil outlet trunnion. These trunnions are coaxial with respect to each other and axially coextensive with and parallel to the axis of the oscillatory shaft 19. The trunnion 101 is rotatable in a cap-like end bearing member 103 having an axial bore 103ª and also having a bronze bushing 103ᵇ, which bearing member is carried in and by one of the arms 22 and is fastened thereto by a flange 104 formed at the end of the bearing member and fastened to arm 22 as by means of screws 105. Interposed between the end of trunnion 101 and its bearing member 103 is a thrust washer 106. The trunnion 101 has an axial bore 106ª through which extends a length of tube 108 from the inner end of bore 103ª, the other end of bore 103ª connecting with the oil supply pipe 42. Thus an oil stream may enter by way of end bearing member 103 and through trunnion 101 into one end of the casing or casing member 91, the oil stream to split at this point to supply both of the parallel tracks 92ª and 93ª. The split oil streams having passed down along the inclined tracks in their respective groove portions join in the lower end of the casing member 91, whence the oil discharges gravitationally through a bore 109 in the outlet trunnion 102 and through a tube 110 extending coaxially from bore 109 into a hollow of collecting space 111 provided in the outer end portion of a cap-like end bearing member 112 having a bronze bushing 113 carrying the trunnion 102, with a thrust washer 114 interposed between the end of the trunnion and its bearing member. The oil discharge pipe 44 is connected to the bearing member 112 so that the oil may gravitate therethrough from the collecting space 110.

Slidable upon the double tracks 92ª and 93ª is a cross head 114ª having a pair of downwardly facing slide shoe elements 115 and 116 at the bottom whereby the cross head is supported upon the tracks, and also having a pair of upwardly facing slide shoe elements 117 and 118 to engage the underside of cover plate 99. In fact, the cross head 114ª comprises a T-shaped swingable member 115ª (see Fig. 16) with cross beam portion of the T-shape constituting a pair of trunnions 119 and 120 carried by bearing members 121 and 122 respectively, each bearing member in turn consisting of a pair of half shells, each half shell representing one of the afore-mentioned upper and lower slide shoe elements. Thus the bearing member 121 comprises a lower half shell 121ª and an upper half shell 121ᵇ provided with the aforementioned lower and upper slide shoe elements 115 and 117 respectively, while the bearing member 122 comprises a lower half shell 122ª and an upper half shell 122ᵇ provided with the aforementioned lower and upper slide shoe elements 116 and 118 respectively. The half shells of each bearing member 121 and 122 are bolted together as indicated by screws 123 and 124 in Figure 15.

The T-shaped swingable member 115ª of the cross head has a central vertical depending stem portion to the lower end of which is fixed the hanger or bracket 26 as indicated by a horizontal row of screw bolts 125. A splash guard or skirt G is shown to be suspended from the casing member 91 as indicated by suspension strips G₁ in Figs. 15 and 16. A longitudinal strip-like horizontal separation member G₂ extends within the skirt G from end to end thereof.

The operation of the lubricating system is dependent upon the functioning of the classifier, inasmuch as the oil circulating pump P is actuated by the oscillations of the shaft 19, that is by the oscillations of the finger 38 engaging pump plunger 69.

The operating cycle of the pump is as follows: As the finger 38 moves in the direction of arrow W, it moves the plunger 69 inwardly with respect to the reservoir 36, so that the piston 69 by its outer full face $F_1$ draws spent oil into the cylinder 65 from the collecting chamber 46 at the foot end of the machine, namely through pipe 47, flexible tube 51, and pipe 49 into the valve head 71, there through passage 75 and check valves 78 and 77 into the pump cylinder, while check valve 82 remains closed due to the suction at this time in passage 75. Referring to Figure 14, this means that the oil enters the valve head 71 through pipe 49, passes through the valve head along the dot-and-dash line arrows $A_2$ and through opening $79^a$ out from the valve head and into the outer end of pump cylinder 65. At the end of this plunger stroke, as the actuating finger 38 swings in the opposite direction as indicated by arrows $W_2$, the oil is thereby expelled from the cylinder by plunger face $F_1$ through passage 80 in the valve head, leaving the valve head by way of opening 85, then by way of passage 87 through the wall of the reservoir 36 entering the spent-oil receiving chamber 60, the pump pressure from piston face $F_1$ meanwhile keeping the check valves 78 and 77 closed.

The oil thus being pumped into chamber 60 is thus forced through filter medium 59 into chamber 61 where the very same reciprocation of the pump plunger 69 pumps the oil through the upstanding pipe 64 into the discharge and distributing chambers 63. That is to say, when the plunger is moved inwardly with respect to the reservoir, the annular piston face $F_2$ acts to draw filtered oil through check valve 88 from chamber 61 into the annular cylinder space 89 surrounding the plunger stem, while the suction caused by face $F_2$ keeps the check valve 90 closed. The subsequent movement of the plunger in the direction outwardly from the reservoir displaces the oil from the inner end of the cylinder through check valve 90 into chambers 63, the expelling pressure meanwhile keeping the check valve 88 closed. From chambers 63 the oil gravitates through the pipes 40 and 41 to the upper pair of track members 28 and $28^a$ entering the same through their inlet trunnions $39^a$ and $39^b$ to lubricate the two track elements $92^a$ and $93^a$ therein while carrying away dust particles which may have entered a track member from below through openings O and thus may have reached the track members or the interior of the track members, the oil in fact gravitating along the inclined tracks, to leave the track members $39^a$ and $39^b$ through their respective outlet trunnions $39^c$ and $39^d$. This once-spent oil continues through pipes 44 and 45 to enter the lower pair of track members 29 and $29^a$ entering the same through their respective inlet trunnions $39^e$ and $39^f$ to lubricate the two track elements therein while again carrying away dust particles which might have reached the tracks or the interior of the track members, the thus twice-spent oil to leave the lower pair of track members through their outlet trunnions $39^g$ and $39^h$ whence it reaches the collecting chamber 46 by way of the pipes $44^a$ and $45^a$. From the collecting chamber 46 the outer piston face $F_1$ again draws the spent oil back into the reservoir 36 for filtration and re-distribution.

The oscillation of the shaft 19 and thereby of the collecting chamber 46 agitates the oil which is in transit through the hard-to-get-at collecting chamber 46, thus tending to prevent the formation of any appreciable amount of sediment or sludge in that chamber, and causing particles suspended in the spent oil to be pumped up into the stationary and accessible reservoir 36 to allow such particles to be deposited there in the chamber 60 whence they can be readily removed or flushed as sludge or sediment through an outlet or cleaning hole $115^b$ closed by a removable plug $116^b$.

The condition and amount of oil in circulation can be readily checked and observed by inspecting the oil in reservoir 36 after removal of the cover plate 57. Also, since the flow of oil passing through the valve head 71 can be observed because of the transparent nature of the material of which it is made, this valve head furnishes a convenient and important means to ascertain at all times and instantaneously whether oil is circulating in the system and the pump is operating normally.

I claim:

1. In combination with a twin rake classifier having a tank providing an inclined deck, a pair of rake structures disposed side by side in said tank, each rake structure being adapted to perform a bodily cyclic movement comprising an upward solids-raking stroke and an elevated return stroke, an actuating mechanism for imparting said cylic movements to said rake structures comprising an inclined medial oscillatable shaft extending from the foot end to the head end of the tank, a pair of upper arm structures extending laterally in opposite directions from the shaft, a pair of lower arm structures extending laterally in opposite directions from the shaft and spaced downwardly along the shaft a distance from said upper arm structures, each upper and each lower arm structure carrying an oscillatable track member coextensive with said shaft and oscillatable about a longitudinal axis parallel to that of the oscillatable shaft, an upper and a lower track member at each side of the inclined shaft serving to reciprocably support respective upper and lower end portions of a respective rake structure, said mechanism further comprising a drive head at the upper end of the deck for oscillating the inclined shaft as well as for longitudinally reciprocating the rake structures in a manner of coordination whereby said cyclic movements are imparted to said rake structures; an oil circulating lubricating system for continuously supplying oil to said tracks and returning spent oil therefrom for redistribution to said tracks, comprising an oil reservoir at the head of the tank, a double-acting plunger pump having a plunger-holding pump cylinder associated with the reservoir at the head of the tank, plunger-actuating means effective between the upper end of the shaft and the pump to effect reciprocation of the plunger by and in time with the oscillations of the shaft, said plunger being effective at one side thereof to draw oil from the reservoir and to deliver it to said track members to gravitate therethrough and as spent oil therefrom to a low point, a sump for the spent oil at said low point, said plunger being effective at the other side thereof to draw spent oil from said low point and to deliver it into said reservoir, and discharge conduit means for gravitationally passing oil from the reservoir to said track members, and suction conduit means for oil to pass from said low point to said pump.

2. The combination according to claim 1, in which said plunger actuating means comprise an actuating finger rigidly connected with the upper end of said shaft to oscillate therewith, said finger having direct actuating relationship with said plunger.

3. The combination according to claim 1, in which said pump has its free plunger end extend into the reservoir, and in which said plunger actuating means comprise an axial extension member at the upper end of said shaft also extending into said reservoir, an actuating finger rigidly extending from said member within said reservoir and oscillatable with said shaft, said finger having direct actuating relationship with said plunger.

4. The combination according to claim 1, in which the pump cylinder is mounted in the wall of the reservoir in a manner whereby the free plunger end extends into the reservoir and the outwardly facing head end of the pump is fixedly associated with the outer face of the wall, and in which said plunger actuating means comprise an axial extension member at the upper end of said shaft extending into said reservoir, an actuating finger rigidly extending from said member within said reservoir and having direct actuating relationship with said plunger.

5. The combination according to claim 1, in which the reservoir has a filter member dividing the reservoir into a lower spent oil receiving chamber having an inlet port and an upper filtered oil chamber supplied with oil rising from the lower chamber through said filter member into the upper chamber, said pump cylinder being mounted in the wall of the reservoir in a manner to have the inwardly facing free plunger end extend into the filtered oil chamber and to have the outwardly facing head end of the pump cylinder fixedly and detachably associated with the outer face of the wall, said plunger actuating means comprising an axial extension member at the end of said shaft extending into said filtered oil chamber, and actuating finger rigidly extending from said extension member within said filtered oil chamber and having direct actuating relationship with said plunger, and a valved end member detachably closing the outer end of the pump cylinder, said closing member having a check valved pump discharge port registering with said lower chamber inlet port for delivering thereto oil drawn from said low point by said one side of the plunger.

CHARLES H. SCOTT.

No references cited.